Oct. 6, 1942.  G. E. STOLTZ  2,298,180
CONTROL SYSTEM
Filed Feb. 26, 1941  2 Sheets-Sheet 1

WITNESSES:
C. J. Weller.
Wm. C. Groome.

INVENTOR
Glenn E. Stoltz.
BY
Crawford
ATTORNEY

Oct. 6, 1942.　　　　　G. E. STOLTZ　　　　　2,298,180
CONTROL SYSTEM
Filed Feb. 26, 1941　　　　2 Sheets-Sheet 2
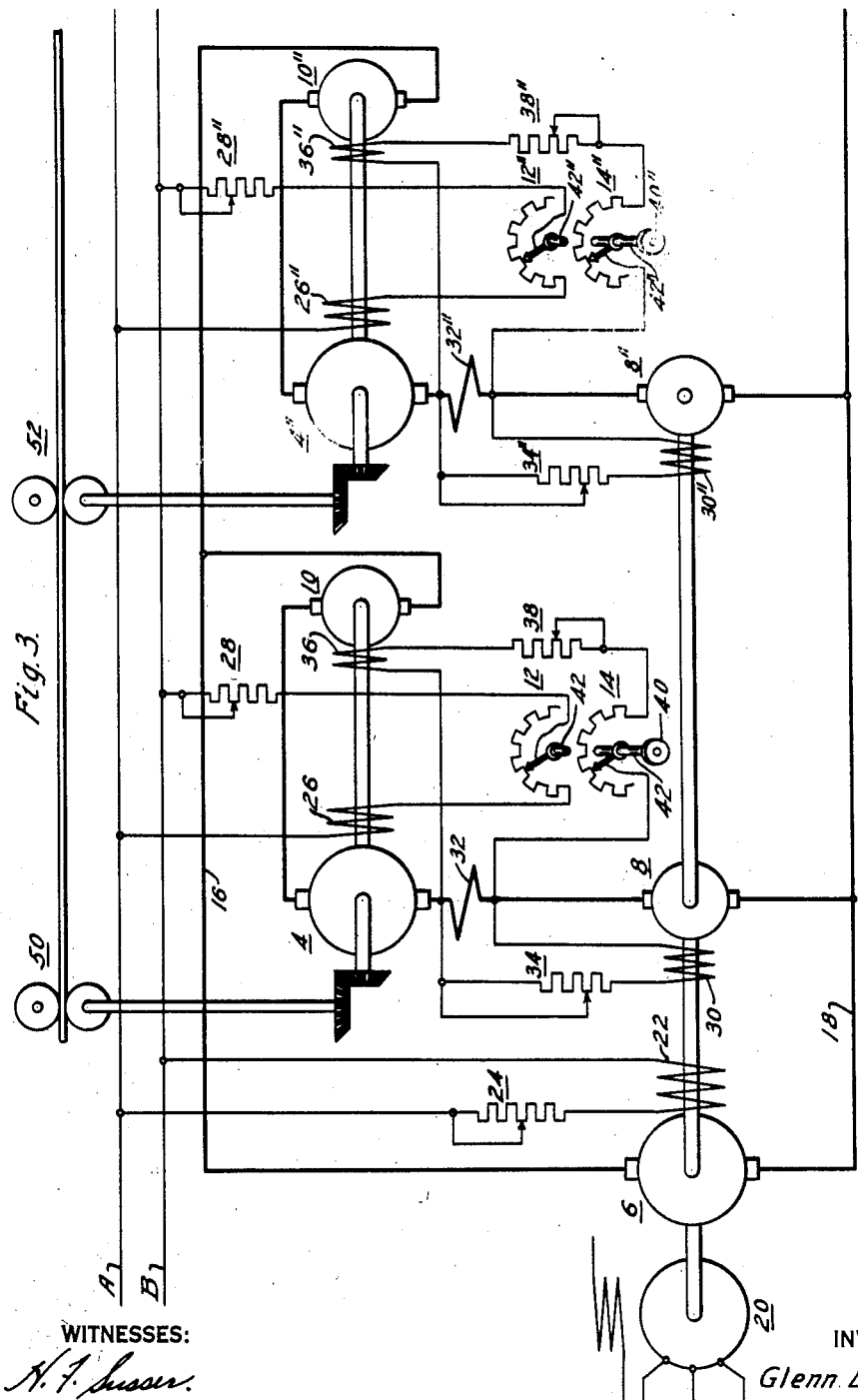
WITNESSES:
N. F. Susser.
Joe Weber.
INVENTOR
Glenn E. Stoltz.
BY
G. M. Crawford
ATTORNEY Patented Oct. 6, 1942

2,298,180

UNITED STATES PATENT OFFICE 2,298,180

CONTROL SYSTEM

Glenn E. Stoltz, Pittsburgh, Pa., assignor to Westinghouse Electric & Manufacturing Company, East Pittsburgh, Pa., a corporation of Pennsylvania Application February 26, 1941, Serial No. 380,625

12 Claims. (Cl. 172—239)

My invention relates, generally, to control systems and, more particularly, to systems for providing the desired speed regulation for direct current motors over a wide speed range.

In certain manufacturing processes it is desirable that drive motors used in the processes have substantially the same regulation throughout a wide speed range. The rolling of steel strip is an example of such a process. In the operation of tandem strip rolling mills, it has been found that considerable strip breakage is due to excessive tensions on the strip occurring during the threading, accelerating, and decelerating periods of the mill operation. This breakage is due to failure to maintain the desired speed relations between the roll stand motors, and this failure is caused by wide variation of the speed regulation of the motors over the range of speeds from the threading speed to the normal running speed.

A direct current mill motor having flat speed regulation or 2 percent regulation at the speed corresponding to the normal running speed of the mill may have from 20 to 40 percent regulation at the speed corresponding to the threading speed of the mill. This variation of speed regulation with variation of motor speed is due in part to the fact that the armature IR-drop is substantially constant throughout the entire speed range for a given armature current. Thus a given IR-drop will be a much greater percentage of the armature potential at the low armature potentials required for low speeds than at the higher armature potentials.

Another factor which influences the speed regulation of the motor is the effect of the circulating current flowing in the turns of the armature winding which are short-circuited by the brushes while undergoing commutation. The normal design of mill motors utilizes commutating pole windings that are over-compensated so that the flow of current in the short-circuited armature coils is in such a direction that it weakens the main field flux. If the commutating pole winding should be such that the machine is under-compensated, the flow of current in the short circuited turns will be such as to strengthen the field with increase in load. This field weakening which occurs in the normal over-compensated motor varies almost directly with the motor speed and load except at the lower speeds where its effect is almost negligible. The field weakening acts in an opposite manner to that of the armature IR-drop upon the motor speed since field weakening tends to increase the motor speed, while the armature IR-drop tends to decrease the motor speed.

An object of my invention is to provide a control system for direct current motors which shall function to so compensate for the motor speed influencing factors as to provide a substantially constant speed regulation or to produce any desired variable speed regulation throughout a predetermined speed range of the motor.

Another object of the invention is to provide a control system for direct current motors which shall function to automatically produce any desired speed regulation, which shall be simple and efficient in operation, and which shall be inexpensive to manufacture, install and maintain.

These and other objects and advantages of the invention will be apparent from the following detailed description taken in connection with the accompanying drawings, in which like reference characters designate like elements of structure, and in which:

Fig. 3 is a diagrammatic view of a motor control system for the drive motors of a strip mill embodying the principal features of the invention.

Figure 1:
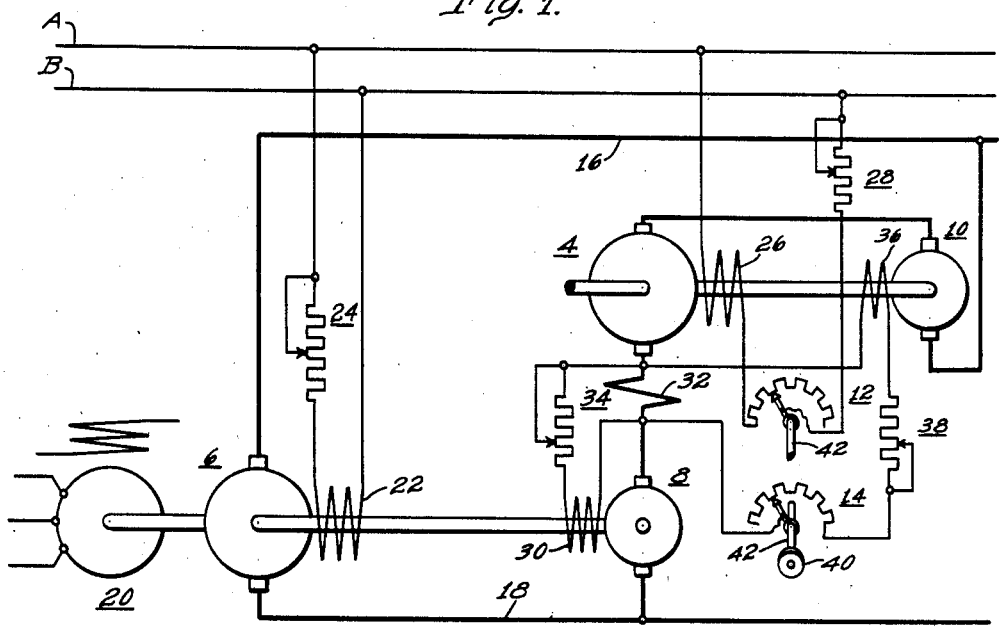
Figure 1 is a diagrammatic view of a motor control system embodying the principal features of a preferred embodiment of the invention.

In practicing the embodiment of the invention shown in Fig. 1, a motor 4 which may be one of the roll stand motors of a tandem strip rolling mill is connected to be energized by a main generator 6 or any similar source of direct current power, in series circuit relation with a generator 8 which is continuously driven at a substantially constant speed and a generator 10 which is driven by the motor 4. The generator 8 is excited in accordance with the armature current of the motor 4 and is so connected that its potential is in aiding or boosting relation with the potential of the main generator 6. The generator 10 is excited in accordance with the armature current of the motor 4 and is so connected that its potential is in opposing or bucking relation to the potential of the main generator 6. Variable resistors 12 and 14 may be simultaneously actuated to increase the effective field excitation of the generator 10 when the excitation of the motor 4 is decreased and to decrease the effective field excitation of the generator 10 when the excitation of the motor is increased.

The embodiment of the invention shown in

Figure 2:
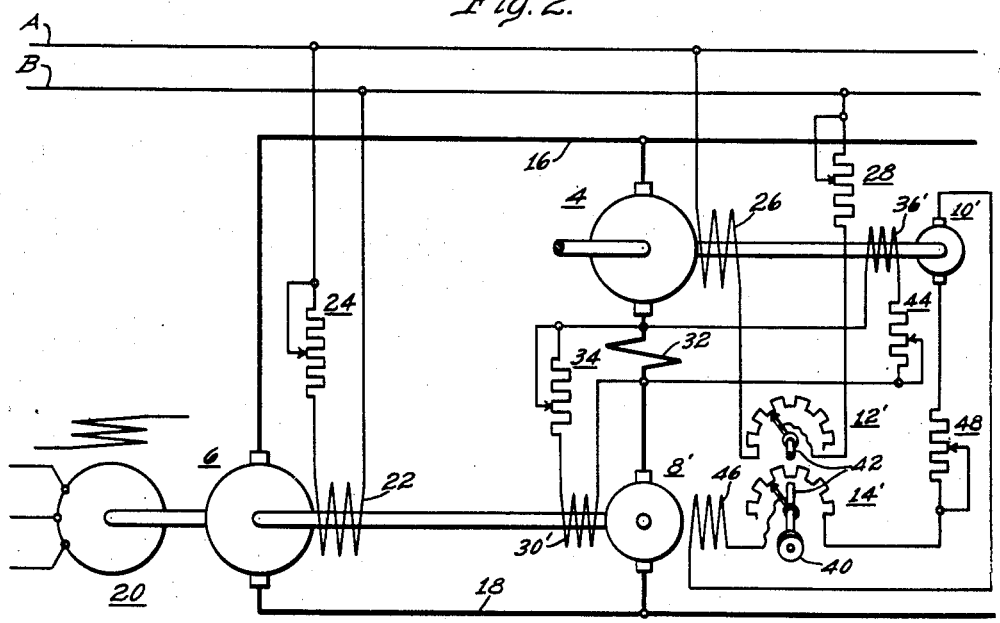
Fig. 2 is a diagrammatic view of a motor control system embodying the principal features of another embodiment of the invention.

Fig. 2 comprises a motor 4 which may be one of the roll stand motors of a tandem strip rolling mill connected to be energized by a main generator 6 in series circuit relation with a generator 8'. The generator 8' has one field winding excited in accordance with the armature current of the motor 4 and is driven at a substantially constant speed. A generator 10' is driven by the motor 4, is excited in accordance with the armature current of the motor 4 and energizes a second field winding of the generator 8'. Variable resistors 12' and 14' may be simultaneously actuated to increase the effect of the generator 10' on the second field winding of the generator 8' when the excitation of the motor 4 is decreased and to decrease the effect of the generator 10' on the second field winding of the generator 8' when the excitation of the motor 4 is increased.

The embodiment of the invention shown in Fig. 3 comprises control systems for the drive motors for a pair of strip rolling stands 50 and 52, the motor control systems being the same as that shown in Fig. 1 and having similar reference characters for designating the similar elements of the systems.

Considering the system of Fig. 1 more in detail, the motor 4 is connected in series circuit relation with the generators 8 and 10 to conductors 16 and 18 which are energized by the main generator 6. The main generator 6 is continuously driven at a substantially constant speed by any suitable power translating device such as a synchronous motor 20. The field winding 22 of the main generator 6 is energized by any suitable source of direct current power which may be connected to the exciter bus conductors A and B, and has in its circuit a variable resistor 24 by which the field excitation of the generator 6 and, therefore, its output potential may be varied. The speed of the motor 4 may thus be varied by varying the output potential of the main generator 6 in a well known manner.

The field winding 26 of the motor 4 is connected to the conductors A and B through the variable resistors 12 and 28 in series and the speed of the motor 4 may also be varied by varying its field excitation by the proper adjustment of the variable resistors 12 and 28.

The field winding 30 of the generator 8 is connected to be energized by the potential drop across the interpole winding 32 of the motor 4 in series circuit relation with a variable resistor 34. The field winding 36 of the generator 10 is connected to be energized by the potential drop across the interpole winding 32 of the motor 4 in series circuit relation with variable resistors 14 and 38. The variable resistors 12 and 14 are simultaneously actuable by an operating member 40 connected to a shaft 42 extending between the resistors.

In the operation of the system of Fig. 1 the IR-drop in the armature of the motor 4 will be compensated for by the output potential of the generator 8 which is applied in series circuit relation with the armature of the motor 4 and in aiding relation to the output potential of generator 6. The degree of compensation for the IR-drop in the armature of the motor 4 may be adjusted if desired by actuating the variable resistor 34.

The generator 10 is so connected in series circuit relation with the armature of the motor 4 that its potential is in opposing relation to the potential of the generator 6. Since the generator 10 is driven by the motor 4, it will have the same speed as the motor 4, and since it is excited in accordance with the armature current of the motor 4, it will be seen that its output potential is proportional to the product of the speed and the armature current of the motor 4. Since the field weakening of the motor 4 caused by the short-circuiting of the armature windings while undergoing commutation is substantially proportional to its speed and its armature current 4, it will be seen that the potential of the generator 10 will compensate for the field weakening of the motor 4.

In the event that the motor should be undercompensated, as discussed hereinbefore, the generator 10 may be so connected that its potential is in aiding relation with the potential of the generator 6 to thus compensate for the field strengthening due to the short-circuiting of the armature windings while undergoing commutation.

When it is desired to vary the speed of the motor 4, by field control or to adjust the base speed of the motor 4, the variable resistor 12 may be adjusted if desired by means of the operating member 40. The variable resistor 14 is adjusted simultaneously with the adjustment of the variable resistor 12 and is so connected that its effective resistance is decreased as the effective resistance of the variable resistor 12 is increased, and its effective resistance is increased as the effective resistance of the resistor 12 is decreased. Thus, the effect per unit of armature current of the potential drop across the interpole winding 32 upon the excitation and, therefore, the output potential of the generator 10, is varied to compensate for changed correction required of the motor 4 so that at the higher values of motor field current there is less field weakening compensating potential generated by the generator 10 since there is a smaller proportionate change of speed of the motor 4 due to field weakening at the higher values of excitation of the motor 4 than at the lower values.

The variable resistors 12 and 14 may be so proportioned as to permit the generator 10 to produce the desired field weakening compensation at any value of field current of the motor 4. The variable resistors 28 and 38 are provided to permit independent adjustment of the values of excitation of the field windings 26 and 36 of the motor 4 and the generator 10, respectively.

In the embodiment of the invention shown in Fig. 2, the motor 4 is connected in series circuit with the generator 8' which has a field winding 30 energized by the potential drop across the interpole winding 32 through a variable resistor 34 as described hereinbefore in connection with the embodiment of the invention shown in Fig. 1. The field winding 26 of the motor 4 is connected to be energized from the conductors A and B through variable resistors 12' and 28.

The generator 10' is driven by the motor 4 and has a field winding 36' which is energized by the potential drop across the interpole winding 32 of the motor 4 through a variable resistor 44. The generator 8' is provided with a second field winding 46 which is connected to be energized by the generator 10' through the variable resistors 14' and 48.

The variable resistors 12' and 14' are connected to be adjusted simultaneously by an operating member 40 through a connecting shaft 42, and the variable resistors 12' and 14' are disposed to be simultaneously varied in inverse relation in a similar manner to the operation of the variable resistors 12 and 14 of the system of Fig. 1. The field winding 46 of the generator 8' is connected in opposing relation to the field winding 30' of the generator 8' when the motor 4 is over-compensated and in aiding relation when the motor 4 is under-compensated.

In the operation of the system of Fig. 2, it will be seen that the effect of the field winding 30 of the generator 8' will be such as to cause the generator 8' to compensate for the IR-drop in the armature of the motor 4. The output potential of the generator 10' will be proportional to both the speed and armature current of the motor 4 so that, the field winding 46 of the generator 8', which is energized by the generator 10' and which is connected in opposition to the field winding 30, will, therefore, compensate for the field weakening of the motor 4 caused by the short-circuited armature windings undergoing commutation.

In the event that the motor 4 should be under-compensated, as discussed hereinbefore, the generator 10' may be so connected as to increase the excitation of the generator 8' with increase in motor load to thereby compensate for the field strengthening of the motor 4 due to the short circuiting of the armature windings while undergoing commutation.

When the speed of the motor 4 is varied by the adjustment of the variable resistor 12' to vary the excitation of the motor 4, the effect of the generator 10' on the field winding 46 will be simultaneously varied to provide the necessary field weakening compensation for the new value of the excitation of the motor 4 to maintain the desired speed load regulation of the motor 4. The variable resistors 28, 44 and 48 are provided to permit independent adjustment of the excitations of the motor 4 and the generators 10' and 8', respectively.

While the control system has been described in connection with single motors, it is to be understood that it is applicable to each of the roll stand motors of a tandem strip rolling mill as shown in Fig. 3 where the proper speed relations must be maintained between the rolls of the several roll stands to prevent strip breakage due to excess tensions on the strip.

It will be seen that I have provided a control system for direct current motors which shall function to so compensate for the IR-drop and field weakening motor speed influencing factors as to provide a substantially constant speed regulation or to produce any desirable speed regulation, throughout a predetermined speed range of the motor and which shall be simple and efficient in operation and inexpensive to manufacture, install, and maintain.

In compliance with the requirements of the patent statutes, I have shown and described herein the preferred embodiments of my invention. It is to be understood, however, that the invention is not limited to the precise construction shown and described but is capable of modification by one skilled in the art, the embodiments herein shown and described being merely illustrative of the principles of my invention.

I claim as my invention:

1. In a control system for a motor having an armature connected to be energized from a source of power, generating means connected in series circuit relation with the armature of the motor, and means responsive to the motor armature current and the product of the motor armature current and the motor speed for varying the net potential of said generating means.

2. In a control system for a plurality of armature type motors which are connected to a common load, separate generating means connected in series circuit relation with the armature of each of the motors, and means responsive to the respective motor armature currents and the product of the respective motor armature currents and the motor speeds for varying the net potential of each of said generating means.

3. In a control system for an armature type motor whose armature is connected to be energized from a source of power, generating means connected in series circuit relation with the armature of the motor, means responsive to the motor armature current and the product of the motor armature current and the motor speed for varying the net potential of said generating means and means for simultaneously varying the excitation of the motor and the effectiveness of the product of the motor armature current and the motor speed upon the net potential of said generating means.

4. In a control system for a plurality of armature type motors which are connected to a common load, separate generating means connected in series circuit relation with the armature of each of the motors, means responsive to the respective motor armature currents and the product of the respective motor armature currents and the motor speeds for varying the net potential of each of said generating means, and means associated with each of the motors for simultaneously varying the excitation of the motor and the effectiveness of the product of the motor armature current and the motor speed upon the net potential of said generating means.

5. In a control system for an armature type motor whose armature is connected to be energized from a source of power, a continuously-driven generator connected in series circuit relation with the armature of the motor and having its potential in aiding relation with the source of power, a second generator connected in series circuit relation with the armature of the motor and having its potential in opposing relation with the source of power, means connecting the motor in driving relation with said second generator, and means exciting said generators in accordance with the armature current of the motor.

6. In a control system for a motor having an armature connected to be energized from a source of power, a continuously-driven generator connected in series circuit relation with the armature of the motor and having its potential in aiding relation with the source of power, a second generator connected in driven relation with the motor, means exciting each of said generators in accordance with the armature current of the motor, other exciting means for said first generator acting in opposing relation to said first exciting means, and means connecting said other exciting means for energization by said second generator.

7. In a control system for an armature type motor whose armature is connected to be energized from a source of power, a continuously-driven generator connected in series circuit relation with the armature of the motor and having its potential in aiding relation with the source of power, a second generator connected in series circuit relation with the armature of the motor and having its potential in opposing relation with the source of power, means connecting the motor in driving relation with said second generator, means exciting said generators in accordance with the amount of armature current of the motor, and means for simultaneously varying the excitation of the motor and the effectiveness of the excitation of said second generator.

8. In a control system for a motor having an armature connected to be energized from a source of power, a continuously-driven generator connected in series circuit relation with the armature of the motor and having its potential in aiding relation with the source of power, a second generator connected in driven relation with the motor, means exciting each of said generators in accordance with the amount of armature current of the motor, other exciting means for said first generator acting in opposing relation to said first exciting means, means connecting said other exciting means for energization by said second generator, and means for simultaneously varying the excitation of the motor and the effectiveness of the energization of said other exciting means by said second generator.

9. In a control system for an armature type motor whose armature is connected to be energized from a source of power, two generators connected in series circuit relation with the armature of the motor, means driving one of said generators at a substantially constant speed, means connecting said one generator in aiding relation with the source of power, means driving the other generator at a speed proportional to the motor speed, means connecting the said other generator in opposing relation with the source of power, means energizing the field windings of said generators with a potential proportional to the motor armature current, and means for simultaneously varying the excitation of the motor and the impedance of the field winding circuit of said other generator.

10. In a control system for a motor having an armature connected to be energized from a source of power, a generator connected in series circuit relation with the motor armature, means driving said generator at a substantially constant speed, a second generator, means driving the second generator at a speed proportional to the motor speed, means exciting said second generator in accordance with the motor armature current, means exciting said first generator in accordance with the differential between the motor armature current and the potential of said second generator, and means for simultaneously varying the excitation of the motor and the impedance of the armature circuit of said second generator.

11. In a control system for an armature type motor whose armature is connected to be energized from a source of power, a generator connected in series circuit relation with the armature of the motor and having its potential in opposing relation to the source of potential, means connecting said generator to be driven by the motor, and means exciting said generator in accordance with the motor armature current.

12. In a control system for an armature type motor whose armature is connected to be energized from a source of power, a generator connected in series circuit relation with the armature of the motor and having its potential in opposing relation to that of the source of power, means connecting said generator to be driven by the motor, means exciting said generator in accordance with the motor armature current, and means for simultaneously varying the excitation of the motor and the effectiveness of the excitation of said generator.

GLENN E. STOLTZ